(12) United States Patent
Hattori et al.

(10) Patent No.: US 6,994,895 B2
(45) Date of Patent: *Feb. 7, 2006

(54) MAGNETIC RECORDING MEDIUM INCLUDING AN ANNEALED ALLOY PARTICLE LAYER AND METHOD OF PRODUCING THE SAME

(75) Inventors: Yasushi Hattori, Kanagawa (JP); Koukichi Waki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/609,510

(22) Filed: Jul. 1, 2003

(65) Prior Publication Data

US 2004/0005458 A1    Jan. 8, 2004

(30) Foreign Application Priority Data

Jul. 3, 2002 (JP) ............................. 2002-194226
May 13, 2003 (JP) ............................. 2003-134069

(51) Int. Cl.
  *B05D 1/12* (2006.01)
  *B05D 3/04* (2006.01)
(52) U.S. Cl. .................. 427/599; 427/130; 427/132
(58) Field of Classification Search ........ 427/127–132, 427/598–599, 240–241, 421, 436
  See application file for complete search history.

(56) References Cited

U.S. PATENT DOCUMENTS

| | | | |
|---|---|---|---|
| 4,093,453 A * | 6/1978 | Makino et al. | 148/527 |
| 5,252,367 A | 10/1993 | Sato et al. | |
| 6,368,658 B1 * | 4/2002 | Schwarz et al. | 427/2.15 |
| 6,372,302 B1 * | 4/2002 | Kurose et al. | 427/548 |
| 2002/0041980 A1 | 4/2002 | Suzuki et al. | |
| 2003/0059604 A1 | 3/2003 | Hattori et al. | |
| 2004/0137276 A1 * | 7/2004 | Hattori et al. | 428/694 B |

FOREIGN PATENT DOCUMENTS

| | | |
|---|---|---|
| DE | 24 61 201 A1 | 7/1975 |
| DE | 25 55 826 A1 | 6/1976 |
| EP | 1 376 625 A2 | 1/2004 |
| JP | 56-153532 A | 11/1981 |
| JP | 2001-101645 A | 4/2001 |
| JP | 2002-157727 A | 5/2002 |
| JP | 2003-73705 A | 3/2003 |

OTHER PUBLICATIONS

Canadian Patent Application Publication No. 1042278.
Science vol. 287, pp. 1989-1992 (2000).
U.S. Appl. No. 2003-113401.
U.S. Appl. No. 3,622,409.
U.S. Appl. No. 4,406,694.
U.S. Appl. No. 5,325,351.
U.S. Appl. No. 5,735,969.
U.S. Appl. No. 6,086,974.
U.S. Appl. No. 6,171,410.
U.S. Appl. No. 6,331,364.
U.S. Appl. No. 2002-0086185.
U.S. Appl. No. 2002-0098381.
U.S. Appl. No. 2004-0071923.

* cited by examiner

*Primary Examiner*—Fred J. Parker
(74) *Attorney, Agent, or Firm*—Sughrue Mion, PLLC

(57) ABSTRACT

A method of producing a magnetic recording medium including the steps of preparing alloy particles capable of forming a CuAu type or $Cu_3Au$ type ferromagnetic order alloy phase, forming an alloy particle layer on a support using the alloy particles, oxidizing the alloy particles, and annealing the alloy particle layer in a magnetic field under a reducing atmosphere. Also disclosed is a magnetic recording medium produced by the method, that is, a magnetic recording medium including a magnetic layer which contains magnetic particles in a CuAu type or $Cu_3Au$ type ferromagnetic order alloy phase and which has a squareness ratio of 0.75 or higher.

15 Claims, No Drawings

MAGNETIC RECORDING MEDIUM INCLUDING AN ANNEALED ALLOY PARTICLE LAYER AND METHOD OF PRODUCING THE SAME

CROSS-REFERENCE TO RELATED APPLICATION

This application claims priority under 35 USC 119 from Japanese Patent Application Nos. 2002-194226 and 2003-134069, the disclosures of which are incorporated by reference herein.

BACKGROUND OF THE INVENTION

1. Field of the Invention

The present invention relates to a magnetic recording medium and the method of producing the same.

2. Description of the Related Art

In order to increase a magnetic recording density of a magnetic recording medium, it is necessary to reduce the size of magnetic particles that are contained in a magnetic layer. For example, with respect to a magnetic recording medium widely used for a videotape, a computer tape, a disk, and the like, the noise would be reduced when the particles have smaller size under the conditions that a ferromagnetic substance has the same mass.

Japanese Patent Application Laid-Open (JP-A) No. 2003-73705 discloses CuAu type or $Cu_3Au$ type ferromagnetic order alloys as materials for magnetic particles that are expected to improve the magnetic recording density. The ferromagnetic order alloys have high magnetocrystalline anisotropy owing to the strain generated when they are ordered, and they are known for their ferromagnetism even when the magnetic particle size is small.

Examples of a CuAu type ferromagnetic order alloy include FePt, which is a material having the highest magnetic anisotropy constant and advantageous in terms of miniaturization of the particle size. Further, it has been known that the magnetic particles can be self-aligned by making the particle size uniform (for example, see Science vol. 287, 1989 (2000)).

The CuAu type or $Cu_3Au$ type ferromagnetic order alloys are produced by a liquid phase method, a vapor phase method, or the like. Magnetic particles immediately after the production by a liquid phase method in particular are in disorder phase and have a face centered cubic crystal structure. Magnetic particles can be transformed into an order phase by annealing at a temperature of a transforming temperature or a higher temperature, which transforms them from a disorder phase to an order phase. In this case, one direction among equivalent three directions of the cubic system becomes an easy magnetization axis at random. However, the respective particles aligned geometrically by self-organization are arranged not evenly but randomly from the viewpoint of the direction of the easy magnetization axis.

From an industrial point of view, it is highly required to align the easy magnetization axis evenly in the same direction. For example, with respect to a magnetic recording tape, the output is improved by evenly aligning the easy magnetization axis in a plane in the longitudinal direction of the tape against the random orientation. Moreover, with respect to a disk, random orientation in a plane is desired, while with respect to a hard disk, orientation in the perpendicular direction to the disk face is desired. In other words, it is desired to control the three-dimensional random orientation state, and to produce a magnetic recording medium in a randomly oriented state in a plane or in a uniaxially oriented state. Also, it is suggested to align the easy magnetization axis perpendicular to the magnetized face in order to reduce a self-loss and to stabilize the magnetization.

SUMMARY OF THE INVENTION

An object of the present invention is to provide a method of producing a magnetic recording medium, the method being capable of controlling the orientation state of magnetic particles. Another object is to provide a magnetic recording medium with a high playback output.

The present inventors have found that the above-mentioned problems can be solved by the invention as described below, as a result of their earnest investigations.

One aspect of the invention provides a magnetic recording medium production method involving: forming an alloy particle layer that is capable of forming a CuAu type or $Cu_3Au$ type ferromagnetic order alloy phase on a support; oxidizing the alloy particle layer; and annealing the alloy particle layer in a magnetic field under a reducing atmosphere.

Another aspect of invention provides a magnetic recording medium produced by the above-mentioned magnetic recording medium production method. In this case, the squareness ratio of the magnetic recording medium is preferably 0.75 or higher.

Further, in other words, still another aspect of the invention provides a magnetic recording medium having a magnetic layer containing magnetic particles in a CuAu type or $Cu_3Au$ type ferromagnetic order alloy phase, characterized in that the squareness ratio of the magnetic layer is 0.75 or higher.

DETAILED DESCRIPTION OF THE INVENTION

A method of producing a magnetic recording medium of the present invention involves the steps of forming, on a support, an alloy particle layer capable of forming a CuAu type or $Cu_3Au$ type ferromagnetic order alloy phase, subjecting the alloy particle layer to an oxidation treatment, and carrying out an annealing treatment to the alloy particle layer in a magnetic field under a reducing atmosphere. The method of producing a magnetic recording medium of the invention can control the orientation state of magnetic particles. This control stems from transforming the alloy particles in the alloy particle layer formed on the support from a disorder phase to an order phase by an annealing treatment. The method of producing a magnetic recording medium of the invention will be described in details below.

Method of Producing a Magnetic Recording Medium

This section will explain the steps of transforming alloy particles from a disorder phase to an order phase, and producing magnetic particles in the CuAu type or $Cu_3Au$ type ferromagnetic order alloy phase in the method of producing a magnetic recording medium of the invention. The steps may include, for example, a step of preparing alloy particles capable of forming the CuAu type or $Cu_3Au$ type ferromagnetic order alloy phase by a liquid phase method or a vapor phase method, a step of forming a layer of the prepared alloy particles on a support, a step of subjecting the alloy particle layer to an oxidation treatment, and a step of subjecting the alloy particle layer to an annealing treatment in a magnetic field under a reducing atmosphere.

The respective steps will be described below.

Alloy Particle Production Step

The alloy particles to be magnetic particles by annealing treatment can be prepared by a vapor phase method or a liquid phase method. In consideration of excellent mass-producibility, a liquid phase method is preferable. As a liquid phase method, a variety of conventionally known methods can be employed. It is preferable to employ one of reducing methods: modified methods of these conventional methods. Among the reducing methods is preferable a reverse micellization method in which the particle size can be easily controlled.

(Reverse Micellization Method)

The reverse micellization method involves at least (1) a step of carrying out reducing reaction by mixing two kinds of reverse micellization solutions and (2) a step of carrying out aging at a set temperature after the reducing reaction.

The respective steps will be described below.

(1) Reduction Step

Firstly, a reverse micellization solution (I) is prepared by mixing a non-aqueous organic solvent containing a surfactant with an aqueous reducing agent solution.

An oil-soluble surfactant can be used as the surfactant. Specific examples thereof include a sulfonate type (e.g. Aerosol OT, manufactured by Wako Pure Chemical Industries, Ltd.), a quaternary ammonium salt type (e.g. cetyltrimethylammonium bromide), an ether type (e.g. pentaethyleneglycol dodecyl ether) and the like.

The amount of the surfactant in the non-aqueous organic solvent is preferably 20 to 200 g/l.

Examples of the non-aqueous organic solvent that dissolves the above-mentioned surfactant include an alkane, an ether, and an alcohol.

Preferable alkanes are those having 7 to 12 carbons, specifically, heptane, octane, iso-octane, nonane, decane, undecane, dodecane, and the like.

Preferable ethers include diethyl ether, dipropyl ether, dibutyl ether and the like.

Preferable alcohols include ethoxyethanol, ethoxypropanol and the like.

Examples of the reducing agent in the aqueous reducing agent solution include alcohols; polyalcohols; $H_2$; HCHO; and compounds containing $S_2O_6^{2-}$, $H_2PO_2^-$, $BH_4^-$, $N_2H_6^+$, $H_2PO_3^-$ and the like, and these may be used solely or in combination of two or more.

The amount of the reducing agent in the aqueous solution is preferably 3 to 50 mol per 1 mol of the metal salt.

It is preferable to adjust the weight ratio (water/surfactant) between water and the surfactant in the reverse micellization solution (I) to be 20 or lower. If the weight ratio exceeds 20, precipitation easily takes place and the particles tend to become uneven. The weight ratio is preferably 15 or lower, and more preferably 0.5 to 10.

In addition to the above-mentioned solution, a reverse micellization solution (II) is prepared by mixing a non-aqueous organic solvent containing a surfactant therein and an aqueous metal salt solution.

The conditions (substances to be used, concentrations, and the like) of the above-mentioned surfactant and the non-aqueous organic solvent are the same as in the case of the reverse micellization solution (I).

A solution that is similar or dissimilar to the reverse micellization solution (I) can be used. The weight ratio between water and the surfactant in the reverse micellization solution (II) is be set in the same manner as in the reverse micellization solution (I). The weight ratio may be the same as or different from that of the reverse micellization solution (I).

With respect to the metal salt in the aqueous metal salt solution, a suitable metal salt may be selected so that the produced magnetic particles are capable of forming a CuAu type or $Cu_3Au$ type ferromagnetic order alloy.

Examples of the CuAu type ferromagnetic order alloy include FeNi, FePd, FePt, CoPt, and CoAu. Among them, FePd, FePt, and CoPt are preferable.

Examples of the $Cu_3Au$ type ferromagnetic order alloy include $Ni_3Fe$, $FePd_3$, $Fe_3Pt$, $FePt_3$, $CoPt_3$, $Ni_3Pt$, $CrPt_3$, and $Ni_3Mn$. Among them $FePd_3$, $FePt_3$, $CoPt_3$, $Fe_3Pd$, $Fe_3Pt$, and $Co_3Pt$ are preferable.

Specific examples of the metal salt include $H_2PtCl_6$, $K_2PtCl_4$, $Pt(CH_3COCHCOCH_3)_2$, $Na_2PdCl_4$, $Pd(OCOCH_3)_2$, $PdCl_2$, $Pd(CH_3COCHCOCH_3)_2$, $HAuCl_4$, $Fe_2(SO_4)_3$, $Fe(NO_3)_3$, $(NH_4)_3Fe(C_2Fe(CH_3COCHCO CH_3)_3$, $NiSO_4$, $CoCl_2$, $Co(OCOCH_3)_2$ and the like.

The concentration (the metal salt concentration) of the aqueous metal salt solution is preferably 0.1 to 1,000 μmol/ml, and more preferably 1 to 100 μmol/ml.

By selecting a suitable metal salt, alloy particles are prepared, the alloy particles being capable of forming a CuAu type or $Cu_3Au$ type ferromagnetic order alloy between a base metal and a noble metal.

It is necessary for the alloy particles in the alloy layer to be transformed from a disorder phase to an order phase by being subjected to an annealing treatment, which will be described later. In order to lower the transformation temperature, a third element such as Sb, Pb, Bi, Cu, Ag, Zn, and In is preferably added to the above-mentioned binary alloy. The third element is preferably added in advance to the metal salt solution in a form of a precursor of each third element. The amount of the third element to be added is preferably 1 to 30% by atom, and more preferably 5 to 20% by atom, based on the binary alloy.

The reverse micellization solutions (I) and (II) prepared in the above-mentioned manner are mixed with each other. The mixing method is not particularly limited. However, in consideration of the reduction evenness, the mixing is preferably carried out by adding and mixing the reverse micellization solution (II) while stirring the reverse micellization solution (I). Upon completion of the mixing, the reducing reaction will be promoted and at that time, the temperature is preferably kept constant in a range of −5 to 30° C.

If the reducing temperature is lower than −5° C., the reducing reaction may become uneven due to freezing of the water phase. On the other hand, if it exceeds 30° C., agglomeration or precipitation may occur, resulting in instability of the system. The reducing temperature is more preferably 0 to 25° C., and still more preferably 5 to 25° C.

Here, the term "constant temperature" means that when a set temperature is defined as T (° C.), an actual temperature is always within a range of T±3° C. Incidentally, an upper limit and a lower limit of the range (T±3° C.) should be within the above-mentioned preferable range of the reducing temperature (−5 to 30° C.).

It is necessary to set a suitable duration of the reducing reaction depending on the amount of the reverse micellization solutions. The duration is preferably 1 to 30 minutes, and more preferably 5 to 20 minutes.

Since the reducing reaction causes significant effects on the monodispersibility of the particle size distribution, it is preferably carried out during stirring at as high a speed as possible.

A preferable stirring apparatus is a stirring apparatus having high shearing force. Specifically, the stirring blade of the stirring apparatus basically has a turbine type or paddle type structure, and a sharp edge is attached at the end part of the blade or at a position to be brought into contact with the blade. The blade is rotated by a motor. Concretely examples thereof include a dissolver (manufactured by Tokushu Kika Kogyo Co., Ltd.), an omni-mixer (manufactured by Yamato Scientific Co., Ltd.), a homogenizer (manufactured by SMT) and the like. By employing such an apparatus, alloy particles in monodispersion state can be synthesized in form of a stable dispersion.

It is preferable to add at least one dispersant having 1 to 3 of amino groups or carboxy groups in at least one of the reverse micellization solutions (I) and (II) in an amount of 0.001 to 10 mol per 1 mol of alloy particles to be produced.

Addition of such a dispersant makes it possible to obtain alloy particles in a better monodispersion state and free from agglomeration.

If the amount is less than 0.001 mol, the monodispersibility of the alloy particles may not be improved. On the other hand, if it exceeds 10 mol, agglomeration may occur.

Preferable dispersants include organic compounds having a group that adsorbs on the surface of the alloy particles. Specific examples include those having 1 to 3 of amino groups, carboxy groups, sulfonic acid groups or sulfinic acid groups. These dispersants may be used alone or in combination.

Such compounds are those having a structural formula of $R-NH_2$, $NH_2-R-NH_2$, $NH_2-R(NH_2)-NH_2$, $R-COOH$, $COOH-R-COOH$, $COOH-R(COOH)-COOH$, $R-SO_3H$, $SO_3H-R-SO_3H$, $SO_3H-R(SO_3H)-SO_3H$, $R-SO_2H$, $SO_2H-R-SO_2H$, and $SO_2H-R(SO_2H)-SO_2H$. Here, R in the formula represents a straight chain, branched, or cyclic and either saturated or unsaturated hydrocarbon.

A particularly preferable compound as the dispersant is oleic acid, which is well-known for colloid stabilization and has been used for protecting metal particles such as iron. The relatively long chain [for example, oleic acid has a 18-carbon chain with a length of about 20 Å (about 2 nm), it is not an aliphatic compound, and it has one double bond] of oleic acid provides important steric hindrance for canceling the intense magnetic interaction among the particles.

Long chain carboxylic acids such as erucic acid, linoleic acid and the like, which is similar to oleic acid, can be used (for example, long chain organic acids having 8 to 22 carbon atoms can be used solely or in combination). Oleic acid (e.g. olive oil) is preferable since it is an easily obtainable and inexpensive natural resource. Oleylamine that is derived from oleic acid is also a useful dispersant.

In the reducing reaction step as described above, it is supposed that a base metal such as Co, Fe, Ni, Cr or the like having a lower redox potential [a metal having about −0.2 V (vs. NHE) or lower] in the CuAu type or $Cu_3Au$ type ferromagnetic order alloy phase is reduced to precipitate in extremely fine size and in monodispersion state. After that, in the temperature increasing step and the aging step, which will be described later, a metal such as Pt, Pd, Rh or the like having a higher redox potential [a metal having about −0.2 V (vs. NHE) or higher] is reduced to be substituted and precipitated by the base metal on the surface with the precipitated base metal being used as a core. The ionized base metal is supposedly reduced again by the reducing agent to precipitate. Alloy particles capable of forming the CuAu type or $Cu_3Au$ type ferromagnetic order alloy can be produced by the repetition of these steps.

(2) Aging Step

Upon completion of the reducing reaction, the solution after the reaction is heated up to an aging temperature.

The aging temperature is preferably kept constant in a range of 30 to 90° C. and the temperature should be set higher than the above-mentioned temperature in the reducing reaction. The duration for aging is preferably 5 to 180 minutes. If the aging temperature and duration are higher and longer than the above range, agglomeration and precipitation tend to take place easily. On the other hand, if they are lower and shorter than the above range, the reaction may not be completed and the composition may become different one. The aging temperature and duration are preferably 40 to 80° C. and 10 to 150 minutes, and more preferably 40 to 70° C. and 20 to 120 minutes.

The definition of the term "constant temperature" is the same as in the case of the reducing temperature. The term "constant temperature" means that when a set temperature is defined as T (° C.), an actual temperature is always within a range of T±3° C. Incidentally, an upper limit and a lower limit of the range (T±3° C.) should be within the preferable range of the aging temperature (30 to 90° C.). The aging temperature is higher than the reducing temperature preferably by 5° C. or more, and more preferably by 10° C. or more within the above-mentioned aging temperature range (30 to 90° C.). If the gap is less than 5° C., a desired composition may not be obtained.

In the above aging step, a noble metal is precipitated on a base metal that is reduced and precipitated in the reducing step.

In other words, the noble metal is reduced only on the base metal, and the base metal and the noble metal are never separately precipitated. Therefore, it becomes possible to obtain the alloy particles capable of efficiently forming the CuAu type or $Cu_3Au$ type ferromagnetic order alloy at a high yield. The alloy particles would have a desired composition ratio and its composition can be controlled as desired. Furthermore, the diameter of the alloy particles can be controlled by properly adjusting the aging temperature and the stirring speed during aging.

After the aging process, it is preferable to carry out a washing process and a dispersing step. In the washing and dispersing steps, the solution after aging is washed with a mixed solution of water and a primary alcohol; precipitates are formed by precipitating with a primary alcohol; and the precipitates are dispersed in an organic solvent.

Such a washing and dispersing step removes impurities and improves the application property at the time of forming a magnetic layer of a magnetic recording medium by coating.

The washing and dispersing steps are carried out preferably at least once for each, and more preferably 2 or more times for each.

As the primary alcohol to be used for washing is not particularly limited, but methanol and ethanol are preferable. The mixing ratio by volume (water/primary alcohol) is preferably in a range of 10/1 to 2/1, and more preferably in a range of 5/1 to 3/1.

If the ratio of water is high, it may become hard to remove the surfactant. On the contrary, if the ratio of the primary alcohol is high, agglomeration may occur.

Alloy particles dispersed in the solution (an alloy particles-containing solution) can be obtained by the above-described manner.

Since the alloy particles are in a monodispersion state, even if being applied to a support, they can keep the evenly dispersed state without being agglomerated. Accordingly, even if annealing treatment is carried out, the each alloy particle does not agglomerate. In consequence, ferromagnetization of the particles can be efficiently carried out, and the particles are excellent in coating property.

The diameter of the alloy particles before an oxidation treatment, which will be described later, is preferably small in view of suppression of noise. On the other hand, if it is too small, the particles may become super-paramagnetic after annealing, being unsuitable for magnetic recording. In general, it is preferably 1 to 100 nm, more preferably 1 to 20 nm, and still more preferably 3 to 10 nm.

(Reducing Method)

A variety of methods are available to prepare alloy particles capable of forming the CuAu type or $Cu_3Au$ type ferromagnetic order alloy by a reducing method. It is preferable to employ a method for reducing a metal with a lower redox potential (hereinafter sometimes simply referred to as a base metal) and a metal with a higher redox potential (hereinafter sometimes simply referred to as a noble metal) by using a reducing agent or the like in an organic solvent, water, or a mixed solution of an organic solvent and water.

The reducing order of the base metal and the noble metal is not particularly limited and both metals may be simultaneously reduced.

Alcohols and polyalcohols are usable as the organic solvent. Examples of the alcohols include methanol, ethanol, butanol and the like, and examples of the polyalcohols include ethyleneglycol, glycerin and the like.

Incidentally, the examples of the CuAu type or $Cu_3Au$ type ferromagnetic order alloy are the same as those already described in the case of the reverse micellization method.

With respect to a method for preparing the alloy particles by precipitating the noble metal in prior, the method disclosed in paragraphs 18 to 30 of Japanese Patent Application No. 2001-269255 can be employed.

Preferable examples of the metal with a higher redox potential include Pt, Pd, Rh and the like, which can be prepared by dissolving $H_2PtCl·6H_2O$, $Pt(CH_3COCHCOCH_3)_2$, $RhCl_3·3H_2O$, $Pd(OCOCH_3)_2$, $PdCl_2$, $Pd(CH_3COCHCOCH_3)_2$ or the like in a solvent. The concentration of the metal in the solution is preferably 0.1 to 1,000 $\mu$mol/ml, and more preferably 0.1 to 100 $\mu$mol/ml.

Preferable examples of the metal with a lower redox potential include Co, Fe, Ni, and Cr, and particularly usable ones are Fe and Co. Such metals can be prepared by dissolving $FeSO_4·7H_2O$, $NiSO_4·7H_2O$, $CoCl_2·6H_2O$, $Co(OCOCH_3)_2·4H_2O$ or the like in a solvent. The concentration of the metal in the solution is preferably 0.1 to 1,000 $\mu$mol/ml, and more preferably 0.1 to 100 $\mu$mol/ml.

Further, it is preferable to add a third element to the binary alloy, similarly in the above described reverse micellization method, to lower the temperature at which alloy particles are transformed to a ferromagnetic order alloy. The amount to be added is the same as in the reverse micellization method.

For example, in the case that a base metal and a noble metal are reduced in this order by using a reducing agent, it is preferable firstly to add the base metal or the base metal with a part of the noble metal, which is reduced by using a reducing agent having a reduction potential lower than −0.2 V (vs. NHE), to a noble metal source, subsequently to carry out reduction using a reducing agent having a redox potential higher than −0.2 V (vs. NHE), and thereafter, to further carry out reduction using a reducing agent having a reduction potential lower than −0.2 V (vs. NHE).

Although the redox potential depends on the pH of the reaction system, alcohols such as 1,2-hexadecanediol, gycerins, $H_2$, and HCHO are preferably used as the reducing agent having a redox potential higher than −0.2 V (vs. NHE). $S_2O_6^{2-}$, $H_2PO_2^-$, $BH_4^-$, $N_2H_5^+$, and $H_2PO_3^+$ are preferably used as the reducing agent having a redox potential lower than −0.2 V (vs. NHE).

Incidentally, when a metal compound with zero valence, such as carbonyl Fe or the like, is used as a raw material of the base metal, a reducing agent for the base metal is not particularly necessary.

Existence of an adsorbent at the time of reducing and precipitating the noble metal effectively stabilize the production of alloy particles. A polymer and a surfactant are preferably used as the adsorbent.

Examples of the above-mentioned polymer include polyvinyl alcohol (PVA), poly(N-vinyl-2-pyrrolidone) (PVP), gelatin and the like. Among them PVP is particularly preferable.

The molecular weight is preferably 20,000 to 60,000, and more preferably 30,000 to 50,000. The amount of the polymer is preferably 0.1 to 10 times, and more preferably 0.1 to 5 times, of the weight of alloy particles to be produced.

The surfactant to be used as the adsorbent preferably contains "an organic stabilizer", which is a long chain organic compound represented by a general formula: R-X. In the general formula, R represents "a tail group", which is a straight or branched hydrocarbon or fluorocarbon chain and generally has 8 to 22 carbon atoms. X in the general formula represents "a head group", a portion (X) providing a specific chemical bond on the surface of the alloy particles. X is preferably any one of sulfinate (—SOOH), sulfonate (—SO$_2$OH), phosphinate (—POOH), phosphonate (—OPO(OH)$_2$), carboxylate, and thiol.

Thus, the preferable organic stabilizers are sulfonic acid (R—SO$_2$OH), sulfinic acid (R—SOOH), phosphinic acid (R$_2$POOH), phosphonic acid (R—OPO(OH)$_2$), carboxylic acid (R—COOH), and thiol (R—SH). Among them, oleic acid is particularly preferable similarly to the case of the reverse micellization method.

The combination of the phosphine and the organic stabilizer (triorganophosphine/acid, etc.) provides excellent controllability on the growth of the particles and on the stabilization of the particles. Didecyl ether and didodecyl ether are also usable, and phenyl ether or n-octyl ether can be preferably used as a solvent owing to their low cost and high boiling point.

Depending on the desired alloy particles and the boiling point of a solvent, the reaction is carried out at a temperature preferably in a range of 80° C. to 360° C., and more preferably in a range of 80° C. to 240° C. If the temperature is lower than the temperature range, particles may not grow. If the temperature is higher than the temperature range, particles may grow without control, resulting in producing undesired byproducts in an increased amount.

The particle diameter of the alloy particles is preferably 1 to 100 nm, more preferably 3 to 20 nm, still more preferably 3 to 10 nm, similarly to that in the case of the reverse micellization method.

A seed crystallization method is effective as a method for growing the particle size (the particle diameter). For being used for a magnetic recording medium, the alloy particles are preferably packed at a highest density in order to increase the recording capacity. Accordingly, the standard deviation of the size of the alloy particles is preferably less than 10%, and more preferably less than 5%. The variation coefficient is preferably less than 10%, and more preferably less than 5%.

If the particle size is too small, the particles become super-paramagnetic, which is not preferable. In order to enlarge the particle size, the seed crystallization method is preferably used, as described above. In this method, a metal that is nobler than the metal composing the particles may sometimes precipitate. In such a case, it is preferable to subject the particles to a hydrogenating treatment in advance to prevent the particles from being oxidized.

The outermost layer of the alloy particles is preferably made of a noble metal from the viewpoint of preventing oxidation. However, since agglomeration may easily take place if the layer is made of a noble metal, the layer is preferably made of an alloy of the noble metal and the base metal. Such a composition of alloy can be easily and efficiently obtained by the liquid phase method as described above.

It is preferable to remove salts from the solution after the synthesis of alloy particles to improve the dispersion stability of the alloy particles. For desalination, there is a method for removing salts together with a supernatant solution by adding excess alcohol to lightly cause agglomeration and causing spontaneous or centrifugal sedimentation. However, such a method easily causes agglomeration, and thus it is preferable to employ an ultrafiltration method.

As described above, the alloy particles dispersed in the solution (the alloy particles-containing solution) can be obtained.

The size of the alloy particles can be measured by using a transmission electron microscope (TEM). Although electron diffraction by the TEM may be employed for determining the crystal system of the alloy particles or magnetic particles, x-ray diffraction is preferably employed since it has a higher precision. For the composition analysis of the inside of the alloy particles or magnetic particles, FE-TEM, which is capable of converging electron beam thin, equipped with EDAX is preferable to be employed for carrying out evaluation. Evaluation of the magnetic properties of the alloy particles or magnetic particles can be carried out by using VSM.

Alloy Particle Layer Formation Step

An alloy particle layer is formed by coating a solution containing the alloy particles onto a support, which will be described later, by a known coating method such as spin coating or the like. The amount of the alloy particles-containing solution to be applied is preferably 0.01 to 1 g/m$^2$.

Oxidation Treatment Step

Magnetic particles having ferromagnetism can be efficiently produced by subjecting the alloy particle layer to an oxidation treatment without increasing the temperature during a subsequent annealing treatment in a non-oxidizing atmosphere. That is supposedly attributed to the phenomenon as described below.

Firstly, oxygen enters in the crystal lattice by oxidizing the alloy particles. When annealing is carried out in a state that oxygen is contained in the lattice, oxygen is dissociated from the crystal lattice by heat. Defects are formed owing to the dissociation of oxygen. The movement of metal atoms composing the alloy becomes easy through the defects, and, accordingly, a phase transformation easily takes place even at a relatively low temperature.

Such a phenomenon can be assumed by measuring EXAFS (Expanded X-ray absorption fine structure) of the alloy particles after the oxidation treatment and the magnetic particles subjected to the annealing treatment.

For example, with respect to Fe—Pt alloy particles not subjected to an oxidation treatment, the existence of bonds between a Fe atom and a Pt atom and between a Fe atom and a Fe atom can be observed.

On the other hand, with respect to the alloy particles subjected to an oxidation treatment, existence of bonds between a Fe atom and an oxygen atom can be observed, but bonds between a Pt atom and a Fe atom are scarcely observed. This result means that Fe—Pt and Fe—Fe bonds are cut by the oxygen atoms. It can be assumed that Pt atoms and Fe atoms become easily movable during annealing.

After the annealing treatment of the alloy particles, no existence of oxygen is observed and the existence of bonds with Pt atoms and Fe atoms around Fe atoms is observed.

In consideration of the above-mentioned phenomenon, it can be understood that, without oxidation, it becomes very hard to promote a phase transformation, and thus it becomes necessary to set the annealing temperature higher. On the other hand, with excess oxidation, the interaction between an easily oxidizable metal, such as Fe or the like, and oxygen would become very intense, sometimes resulting in producing metal oxides.

Therefore, it becomes important to control the oxidation state of the alloy particles and for that, it is required for the oxidation conditions to be set to be optimum.

The oxidation treatment can be carried out by applying the alloy particles-containing solution to a support, and by exposing the formed coating film to air, oxygen, or a mixture of oxygen and inert gas. The exposure to air or the like may be carried out under a normal pressure or an increased pressure.

The oxidation treatment temperature is preferably 0 to 150° C., more preferably 0 to 100° C., and still more preferably 15 to 80° C.

The oxidation state of the alloy particles is preferably evaluated by EXAFS or the like. The number of bonds of a base metal such as Fe with oxygen is preferably 0.5 to 4, and more preferably 1 to 3, from a viewpoint that oxygen cuts Fe—Fe and Pt—Fe bonds.

<Annealing Treatment Step>

The alloy particles subjected to an oxidation treatment have a disorder phase. As described above, no ferromagnetism can be obtained in a disorder phase. In order to form the order phase, heating treatment (annealing) is required. It is necessary to carry out the heating treatment at a temperature not lower than the transformation temperature of the alloy composing the alloy particles to cause order-disorder transformation, which is measured by employing differential thermal analysis (DTA). In the invention, the annealing treatment is carried out in a magnetic field and under a reducing atmosphere.

The transformation temperature is generally about 500° C., but it can be lowered by adding a third element. Accordingly the annealing treatment temperature is preferably adjusted to be 150° C. or more, and more preferably 150 to 500° C.

Further, if the annealing treatment is carried out in particle state, the particles are easily transferred and fusion of the particles easily takes place. For that, although high coercive force can be obtained, the particle size tends to become large, which is not preferable. Accordingly, the annealing treatment is preferably carried out in a state that the alloy particles are applied to a support or the like from the viewpoint of prevention of agglomeration of the alloy particles.

Further, the alloy particles are annealed on a support to become magnetic particles, so that the formed layer of the magnetic particles can be used as a magnetic layer and the resulting body can be usable as a magnetic recording medium.

In a method of producing a magnetic recording medium of the invention, the annealing is carried out in a magnetic field and under a reducing atmosphere to control the orientation state of the magnetic particles. The magnetic field can be generated by permanent magnets, electromagnets, and combination of a capacitor and a thyristor. The combination of a capacitor and a thyristor is excellent in terms of intense magnetic field generation.

As the magnetic field, a magnetic field with higher intensity is more preferable in terms of controllability of orientation of the magnetic particles. However, a special apparatus has to be employed if the magnetic field is intensified unnecessarily to a high extent and it is undesirable in terms of the production cost. Accordingly, the magnetic field at the time of annealing is preferably 7.96 to 7961 kA/m (100 to 100,000 Oe), and more preferably 7.96 to 5573 kA/m (100 to 70,000 Oe).

It is necessary for the magnetic field to be applied at least during the phase transformation. Further, application of an intense magnetic field in a state that the coating film of the alloy particles-containing layer is not dried yet results in surface roughness and therefore, it is not preferable. Consequently, it is preferable to dry the layer or to corbonize the dispersant before the application of the magnetic field.

The reducing atmosphere, as the word means, is the atmosphere having reducing capability. Examples thereof include $H_2$ gas atmosphere, methane gas atmosphere, ethane gas atmosphere, and propane gas atmosphere. From a viewpoint of explosion prevention, a mixed gas atmosphere of $H_2$ gas and an inert gas is preferable.

The annealing can be carried out by heating means such as an electric furnace, IR heating, and laser heating. Particularly, laser heating is preferable since it is capable of increasing the temperature high within a short time.

In the above-mentioned annealing treatment, it is preferable to employ laser heating as the heating means and the combination of a capacitor and a thyristor for the magnetic field.

As a support, both inorganic and organic supports may be employed if they are usable for a magnetic recording medium.

The inorganic supports include Al, Mg alloys such as Al—Mg and Mg—Al—Zn, glass, quartz, carbon, silicon, ceramic and the like. These supports are excellent in impact resistance and have rigidity suitable for thinning and high speed rotation. Further, as compared with organic supports, they have high durability to heat.

The organic supports include polyesters such as polyethylene terephthalate, polyethylene naphthalate; polyolefins; cellulose triacetate, polycarbonates, polyamides (including aliphatic polyamides and aromatic polyamides such as aramide and the like), polyimides, polyamideimides, polysulfones, polybenzoxazoles, and the like.

When applying the alloy particles to the support, a variety of additives may be added, if necessary, to a alloy particles-containing solution that has been subjected to the oxidation treatment, and the resulting solution is applied to the support.

The content of the alloy particles is preferably controlled so as to give a desired concentration (0.01 to 0.1 mg/ml).

The method for applying to the support includes air doctor coating, blade coating, rod coating, extrusion coating, air knife coating, squeezing coating, immersion coating, reverse roll coating, transfer roll coating, gravure coating, kiss coating, cast coating, spray coating, spin coating and the like.

In order to prevent fusion of particles at the time of annealing, it is preferable to carry out an annealing treatment at a temperature of a transformation temperature or lower under an inert gas atmosphere to carbonize the dispersant, and thereafter to carry out an annealing treatment at a temperature of a transformation temperature or higher under a reducing atmosphere. In that case, the most preferable embodiment is as follows: after annealing treatment at the transformation temperature or lower is carried out, if necessary, a Si type resin or the like is applied to the layer containing alloy particles and then annealing treatment is carried out at a transformation temperature or higher.

Annealing treatment in such a manner as described above causes phase transformation of the alloy particles from the disorder phase to the order phase to obtain magnetic particles having ferromagnetism.

The magnetic particles produced by the above-mentioned magnetic particle production method of the invention preferably have a coercive force of 95.5 to 398 kA/m (1,200 to 5,000 Oe). When applying to a magnetic recording medium, the coercive force is more preferably 95.5 to 278.6 kA/m (1,200 to 3,500 Oe) in consideration of suitability with a recording head.

Further, the particle diameter of the magnetic particles is preferably 1 to 100 nm, more preferably 3 to 20 nm, and still more preferably 3 to 10 nm.

Magnetic Recording Medium

A magnetic recording medium of the invention comprises a magnetic layer containing magnetic particles in the CuAu type or $Cu_3Au$ type ferromagnetic order alloy phase and has 0.75 or higher squareness ratio of the magnetic layer.

The magnetic recording medium of the invention can be produced by the above-mentioned magnetic recording medium production method of the invention. That is, it can be accomplished to make the squareness ratio of the magnetic layer be 0.75 or higher by the above-mentioned method of producing a magnetic recording medium. For example, it can be accomplished by keeping the respective parameters in the magnetic recording medium production method within the following ranges: (1) the magnetic field: 796.2 to 1592.4 kA/m (10 to 20 kOe); and (2) the annealing temperature: 300 to 450° C.

It should be noted that the means for accomplishing the squareness ratio of 0.75 or higher is not limited to the magnetic recording medium production method of the invention.

Examples of the magnetic recording medium include a magnetic tape such as a videotape, and a computer tape; a magnetic disk such as a floppy (R) disk, and a hard disk; and the like.

In the case the magnetic recording medium of the invention is applied to a perpendicular magnetic recording medium or a magnetic recording tape, the squareness ratio in the direction perpendicular to the plane is 0.75 or higher, preferably 0.8 or higher, and more preferably 0.9 or higher.

When applying to a plane magnetic recording disk medium, the squareness ratio of the plane is preferably 0.75 to 0.8. Adjusting the ferromagnetic particles in the magnetic layer in such a manner provides a magnetic layer, which is capable of high density recording with excellent electromagnetic conversion properties, and has a high orientation degree ratio.

On the other hand, the orientation degree ratio of the magnetic particles in the magnetic layer in the magnetic recording medium of the invention is preferably 0.85 or higher, more preferably 0.90 or higher, and still preferably 0.95 or higher. The orientation degree ratio is a value obtained by dividing the minimum squareness ratio in the circumferential direction of the disk-type magnetic recording medium by the maximum squareness ratio. A higher value means a small fluctuation of the output in the circumferential direction and therefore it is preferable as a magnetic recording medium.

When, as described above, alloy particles (alloy particles-containing solution) are applied to a support, and annealed to obtain magnetic particles, the magnetic particles-containing layer can be used as a magnetic layer.

The thickness of the magnetic layer to be formed is preferably 4 nm to 1 $\mu$m, and more preferably 4 nm to 100 nm, depending on the kind of magnetic recording media.

The magnetic recording medium of the invention may comprise another layer in addition to the magnetic layer, when necessary. For example, in the case of a disk, it is preferable to form a magnetic layer and a non-magnetic layer on the side opposite to the magnetic layer. In the case of a tape, a back layer is preferably formed on an insoluble support on the side opposite to the magnetic layer.

The formation of a very thin protection film on the magnetic layer improves wear resistance. Furthermore, applying a lubricating agent to the protection film improves smoothness, and consequently brings a magnetic recording medium with sufficient reliability.

Examples of the material for the protection film include oxides such as silica, alumina, titania, zirconia, cobalt oxide, nickel oxide and the like; nitrides such as titanium nitride, silicon nitride, boron nitride and the like; carbides such as silicon carbide, chromium carbide, boron carbide and the like; and carbon such as graphite, amorphous graphite and the like and particularly preferable one is, in general, hard amorphous carbon, so-called diamond-like carbon.

Carbon is very suitable as a material for the protection film, since the protection film made of carbon has a sufficient wear resistance even with an extremely thin film and hardly causes baking in a sliding member.

With respect to a formation method of the carbon protection film, a sputtering method is generally used for hard disks. On the other hand, many methods employing plasma CVD having a high film formation speed have been proposed for products, such as videotapes, which require continuous film formation. Accordingly, these methods may also be considered applicable.

It is reported that among these methods, a plasma injection CVD (PI-CVD) method has an extremely high film formation speed and is capable of providing a high quality carbon protection film, which is hard and has few pin holes (for example, see JP-A Nos. 61-130487, 63-279426, and 3-113824).

The carbon protection film preferably has a Vickers hardness of 1,000 kg/mm$^2$ or more, and more preferably 2,000 kg/mm$^2$ or more. Further, the film preferably has an amorphous structure as the crystal structure and is non-conductive.

When a diamond-like carbon film is used as the carbon protection film, the structure can be confirmed by Raman spectroscopic analysis. The diamond-like carbon film can be confirmed by detecting a peak at 1,520 to 1,560 cm$^{-1}$ in the Raman spectroscopic analysis. If the structure of the carbon film is transformed from the diamond-like structure, a peak detected by Raman spectroscopic analysis deviates from the above-mentioned range, and the hardness of the protection film tends to decrease.

Preferable examples of the carbon raw material for forming the carbon protection film include carbon-containing compounds including alkanes such as methane, ethane, propane, and butane; alkenes such as ethylene and propylene; alkynes such as acetylene. A carrier gas such as argon, or an additive gas such as hydrogen and nitrogen for improving the film quality may be added, if necessary.

If the carbon protection film is too thick, the electromagnetic conversion properties are degraded and the adhesion strength to the magnetic layer decreases. On the other hand, if the film is too thin, wear resistance becomes insufficient. Accordingly, the film thickness is preferably in a range of 2.5 to 20 nm, and more preferably in a range of 5 to 10 nm.

Furthermore, it is preferable to etch the surface of a magnetic layer in advance with an inert gas or to improve the surface in advance by exposing it to plasma of a reactive gas such as oxygen in order to improve the adhesion strength between the protection film and the magnetic layer that constitutes a substrate.

The magnetic layer may have a layered structure or comprise a known non-magnetic under layer or intermediate layer under the magnetic layer in order to improve the electromagnetic conversion properties. In order to improve running durability and corrosion resistance, as described above, a lubricating agent and an anti-rust agent are preferably added to the above-mentioned magnetic layer or the protection film. Examples of the lubricating agent include known hydrocarbon-based lubricating agents, fluoro type lubricating agents, extreme pressure additives, and the like.

Examples of the hydrocarbon-based lubricating agents include carboxylic acids such as stearic acid and oleic acid; esters such as butyl stearate; sulfonic acids such as octadecylsulfonic acid; phosphoric acid esters such as monooctadecyl phosphate; alcohols such as stearyl alcohol and oleyl alcohol; carboxylic acid amides such as stearic acid amide; amines such as stearic acid amine; and the like.

Examples of the fluoro type lubricating agents include lubricating agents obtained by substituting some or all of the alkyl groups of the above-mentioned hydrocarbon-based lubricating agents with fluoroalkyl groups or perfluoropolyether groups.

Examples of the perfluoropolyether groups include perfluoromethylene oxide polymers, perfluoroethylene oxide polymers, perfluoro-n-propylene oxide polymers $(CF_2CF_2CF_2O)_n$, perfluoroisopropylene oxide polymers $(CF(CF_3)CF_2O)_n$, and their copolymers.

Further, compounds having polar functional groups such as hydroxy groups, ester groups; and carboxy groups in the terminals and molecules of the alkyl groups of the hydrocarbon-based lubricating agents have a significant effect to reduce friction force and are therefore preferable.

The molecular weight of them is preferably 500 to 5,000, and more preferably 1,000 to 3,000. If the molecular weight is lower than 500, the volatility may become too high and the lubricating property may become poor. On the other hand, if it exceeds 5,000, the viscosity would become so high that a slider and a disk may easily stick to each other, resulting in operation stop, head crush, etc.

Specifically, the perfluoropolyethers are commercially available in trade names of FOMBLIN manufactured by Ausimont, Inc. and KRYTOX manufactured by Du Pont K.K.

Examples of the extreme pressure additives include phosphoric acid esters such as trilauryl phosphate; phoshorous acid esters such as trilauryl phosphite; thiophosphorous acid esters and thiophosphoric acid esters such as trilauryl trithiophosphite; and sulfur-type extreme pressure additives such as dibenzyl disulfide and the like.

The lubricating agents may be used solely or in combination. As a method of applying these lubricating agents to the magnetic layer or the protection film, a lubricating agent dissolved in organic solvent may be applied by a wire bar method, a gravure method, a spin coating method, a dip coating method, or the like; or a lubricating agent is applied by a vacuum evaporation method.

Examples of the anti-rust agent include nitrogen-containing heterocyclic compounds such as benzotriazole, benzoimidazole, purine, and pyrimidine and their derivatives that are obtained by introducing an alkyl side chain or the like to their mother nucleus; nitrogen- and sulfur-containing heterocyclic compounds such as benzothiazole, 2-mercaptobenzothiazole, tetrazaindene cyclic compounds, thiouracil compounds, and their derivatives.

As described above, when the magnetic recording medium is a magnetic tape, a back coat layer (a backing layer) may be formed on a non-magnetic support on the side where the magnetic layer is not formed. The back coat layer is a layer formed by applying a back coat layer forming material onto a non-magnetic support on the side where a magnetic layer is not formed. Here, the back coat layer forming material is produced by dispersing a granular component such as an abrasive, an anti-static agent, and the like and a binder in a known organic solvent.

Examples of the granular component include various types of inorganic pigments and carbon black. Examples of the binder include nitrocellulose, phenoxy resin, vinyl chloride type resin, and polyurethane type resin, which are used solely or in combination.

A known adhesive layer may be formed on the side where the alloy particle-containing solution is coated or on the side where the back coat layer is formed.

The arithmetical mean deviation of the surface of the magnetic recording medium produced in the above-described manner is preferably in a range of 0.1 to 5 nm, and more preferably in a range of 1 to 4 nm, with a cut off value of 0.25 mm. It is desirable for a magnetic recording medium of high density recording to have a surface with extremely excellent smoothness such as within the above ranges.

One method for obtaining such a surface is carrying out a calendaring treatment after the formation of the magnetic layer. Alternatively, a varnish treatment may be carried out to obtain such a surface.

The obtained magnetic recording medium can be used after being punched with a punching apparatus or properly cut into a desired size by a cutting apparatus.

EXAMPLES

The present invention will be described in details with reference to examples. However, it should not be construed that the invention be limited to these Examples.

[Examples 1 to 4 and Comparative Examples 1 to 6]

(Production of FePt Alloy Particles)

The following processes are carried out in high purity $N_2$ gas.

An aqueous reducing agent solution is produced by dissolving 0.76 g of $NaBH_4$ (manufactured by Wako Pure Chemical Industries, Ltd.) in 16 ml of water (deoxygenation: 0.1 mg/l or lower). A reverse micellization solution (I) is prepared by adding an alkane solution produced by mixing 10.8 g of Aerosol OT (manufactured by Wako Pure Chemical Industries, Ltd.), 80 ml of decane (manufactured by Wako Pure Chemical Industries, Ltd.), and 2 ml of oleylamine (manufactured by Tokyo Kasei Kogyo Co., Ltd.) to the aqueous reducing agent solution and by mixing the resulting mixture.

An aqueous metal salt solution is produced by dissolving 0.46 g of iron triammonium trioxalate ($Fe(NH_4)_3(C_2O_4)_3$) (manufactured by Wako Pure Chemical Industries, Ltd.) and 0.38 g of potassium chloroplatinate ($K_2PtCl_4$) (manufactured by Wako Pure Chemical Industries, Ltd.) in 12 ml of water (deoxygenated). A reverse micellization solution (II) is produced by adding an alkane solution produced by mixing 5.4 g of Aerosol OT and 40 ml of decane to the aqueous metal salt solution and mixing the resulting mixture.

While the reverse micellization solution (I) is stirred at 22° C. and at a high stirring speed by an omni-mixer (manufactured by Yamato Scientific Co., Ltd.), the reverse micellization solution (II) is added thereto at once. After 10 minutes, while being stirred by a magnetic stirrer, the mixed solution is aged for 60 minutes at a temperature raised to 50° C.

After that, 2 ml of oleic acid (manufactured by Wako Pure Chemical Industries, Ltd.) is added and cooled to a room temperature. After cooling, the resulting mixed solution is taken out to the atmosphere. To break the reverse micelle, a mixed solution of 100 ml of water and 100 ml of methanol is added to separate the resulting solution into a water phase and an oil phase. Alloy particles dispersed in the oil phase are obtained. The oil phase is washed with a mixed solution of 600 ml of water and 200 ml of methanol five times.

After that, 1,100 ml of methanol is added to cause flocculation of the alloy particles and the alloy particles are precipitated. After the supernatant liquid is removed, the alloy particles are again dispersed by adding 20 ml of heptane (manufactured by Wako Pure Chemical Industries, Ltd.).

Further, the precipitation and dispersion steps, i.e. the precipitation step of adding 100 ml of methanol and the dispersion step of adding 20 ml of heptane, are repeated two times. Finally, 5 ml of heptane is added to produce a FePt alloy particles-containing solution, which has a weight ratio between water and surfactant (water/surfactant) of 2.

The alloy particles are subjected to measurement of the yield, the composition, the volume average particle diameter, and the distribution (variation coefficient) to find the following results.

The composition and the yield are measured by ICP spectroscopy (inductively coupled plasma emission petrochemical analysis).

The volume average particle diameter and the distribution are measured by counting the particles photographed by TEM (transmission electron microscope; manufactured by Hitachi, Ltd., 30 kV) and by statistically processing the results.

The alloy particles used for the measurement are alloy particles collected from the prepared alloy particles-containing solution, sufficiently dried, and then heated in an electric furnace.

Composition: FePt alloy containing 44.5% by atom of Pt
Yield: 85%
Average particle diameter: 4.2 nm
Variation coefficient: 5%

(Oxidation Treatment)

Vacuum degassing is carried out so as to concentrate the prepared alloy particles-containing solution and to adjust the concentration of the alloy particles to be 4% by weight. After the concentration, the ambient atmosphere is controlled to be a normal pressure. In order to oxidize the alloy particles, oxygen gas is supplied to the alloy particles-containing solution for 10 minutes. The solvent evaporated at the time of the oxidation treatment is supplemented by adding heptane. To the solution after the oxidation treatment is added 0.04 ml of oleylamine per 1 ml of the alloy particles-containing solution.

(Annealing Treatment)

A support (thickness of 1 mm) is prepared by firing the surface of a Si support to form $SiO_2$ from the surface to the depth of about 300 nm. The alloy particles-containing solution subjected to the oxidation treatment is coated on the support by a spin coater. The coating amount of alloy particles is adjusted to 0.5 g/m$^2$.

After the coating, under the annealing atmosphere of Table 1, the temperature is raised up to 300° C. from a room temperature at a rate of 50° C./min. While externally applying a magnetic field of Table 1, the temperature is raised from 300° C. to the temperature of Table 1. The temperature is maintained for 30 minutes, and the temperature is decreased to a room temperature at a rate of 50° C./min. The annealing treatment is thus carried out, and a magnetic layer (film thickness: 50 nm) containing the magnetic particles is formed to produce a magnetic recording medium. Here, the magnetic field is externally applied by using electromagnets manufactured by Toei Industry Co., Ltd.

The magnetic particles are scraped off the magnetic layers of the respective magnetic recording media obtained by Examples 1 to 4 and Comparative Examples 1 to 6 by spatyura and subjected to the evaluation of magnetic properties and the measurement of volume average particle diameter. The results are shown in the following Table 1.

With respect to the measurement of the magnetic properties (measurement of coercive force), specimens with 6×8 mm are cut and taken from a disk and the coercive force Hc and the squareness ratio (SQ) are measured under conditions of applied magnetic field intensity of 1,194 kA/m (15 kOe) using a high sensitivity magnetization vector measurement apparatus manufactured by Toei Kogyo Co., Ltd., and a data processing apparatus manufactured by the same company.

The volume average particle diameter is measured at accelerating voltage of 300 kV by using the above-mentioned TEM. The volume average particle diameter is 5 nm for all the Examples and the Comparative Examples.

TABLE 1

|  | Oxidation | Annealing atmosphere | Annealing temperature | Magnetic field (kA/m) | Hc (kA/m) | SQ |
|---|---|---|---|---|---|---|
| Example 1 | Oxygen | $H_2$ | 400° C. | 1194 (15 kOe) | 254.8 (3200 Oe) | 0.8 |
| Example 2 | Oxygen | $H_2$ | 450° C. | 1194 (15 kOe) | 318.5 (4000 Oe) | 0.75 |
| Example 3 | Oxygen | $H_2(8\%)N_2(92\%)$ | 400° C. | 1194 (15 kOe) | 159.2 (2000 Oe) | 0.8 |
| Example 4 | Oxygen | $H_2(8\%)N_2(92\%)$ | 450° C. | 1194 (15 kOe) | 238.9 (3100 Oe) | 0.75 |
| Comparative Example 1 | Oxygen | $H_2$ | 400° C. | Void | 310.5 (3100 Oe) | 0.55 |
| Comparative Example 2 | Oxygen | $H_2$ | 450° C. | Void | 310.5 (3900 Oe) | 0.5 |
| Comparative Example 3 | Oxygen | $N_2$ | 400° C. | 1194 (15 kOe) | 15.92 (200 Oe) | 0.3 |
| Comparative Example 4 | Oxygen | $N_2$ | 450° C. | 1194 (15 kOe) | 19.9 (250 Oe) | 0.2 |
| Comparative Example 5 | Void | $H_2$ | 400° C. | 1194 (15 kOe) | 17.5 (220 Oe) | 0.3 |
| Comparative Example 6 | Void | $H_2$ | 450° C. | 1194 (15 kOe) | 23.9 (300 Oe) | 0.2 |

As shown in Table 1, any of the magnetic recording media of Examples 1 to 4 has a coercive force Hc of 2,000 Oe or higher and a squareness ratio SQ of 0.75 or higher. The magnetic recording media of Comparative Examples 1 and 2, which are different from the Examples in that no magnetic field is applied, have a high coercive force Hc but do not provide a desirable value of the squareness ratio SQ. Further, neither satisfactory coercive force Hc nor satisfactory squareness ratio is obtained in Comparative Examples 3 and 4, in which annealing is not carried out in a reducing atmosphere. Similarly, neither satisfactory coercive force Hc nor satisfactory squareness ratio is obtained in Comparative Examples 5 and 6, in which no oxidation treatment is carried out.

The present invention provides a method of producing a magnetic recording medium, the method being capable of controlling the orientation state of magnetic particles. The invention also provides a magnetic recording medium with high playback output.

What is claimed is:

1. A method of producing a magnetic recording medium, the method comprising the steps of:
    preparing alloy particles capable of forming a CuAu type or $Cu_3Au$ type ferromagnetic order alloy phase;
    forming an alloy particle layer on a support using the alloy particles;
    oxidizing the alloy particles; and
    annealing the alloy particle layer in a magnetic field under a reducing atmosphere.

2. The method of producing a magnetic recording medium of claim 1, wherein the alloy particles are prepared by a reducing method.

3. The method of producing a magnetic recording medium of claim 1, wherein the alloy particles are prepared by a reverse micellization method.

4. The method of producing a magnetic recording medium of claim 1, wherein at least one third element selected from Sb, Pb, Bi, Cu, Ag, Zn, and In is added to the alloy particles.

5. The method of producing a magnetic recording medium of claim 1, wherein the alloy particles are oxidized at a temperature of 0 to 150° C.

6. The method of producing a magnetic recording medium of claim 1, wherein the alloy particles are oxidized at a temperature of 0 to 100° C.

7. The method of producing a magnetic recording medium of claim 1, wherein the alloy particles are oxidized at a temperature of 15 to 80° C.

8. The method of producing a magnetic recording medium of claim 1, wherein a number of bonds between a base metal and oxygen is controlled to be 0.5 to 4 by the oxidation treatment.

9. The method of producing a magnetic recording medium of claim 1, wherein a number of bonds between a base metal and oxygen is controlled to be 1 to 3 by the oxidation treatment.

10. The method of producing a magnetic recording medium of claim 1, wherein the alloy particle layer is annealed at a temperature of 150 to 500° C.

11. The method of producing a magnetic recording medium of claim 1, wherein the alloy particle layer is annealed at a temperature of 300 to 450° C.

12. The method of producing a magnetic recording medium of claim 1, wherein the magnetic field at the time of annealing treatment is 7.96 to 7,961 kA/m (100 to 100,000 Oe).

13. The method of producing a magnetic recording medium of claim 1, wherein the magnetic field at the time of annealing treatment is 7.96 to 5,573 kA/m (100 to 70,000 Oe).

14. The method of producing a magnetic recording medium of claim 1, wherein the magnetic field at the time of annealing treatment is 796.2 to 1,592.4 kA/m (10,000 to 20,000 Oe).

15. The method of producing a magnetic recording medium of claim 11, wherein the magnetic field at the time of annealing treatment is 796.2 to 1,592.4 kA/m (10,000 to 20,000 Oe).

* * * * *